United States Patent [19]

Schoettle et al.

[11] 4,014,042

[45] Mar. 22, 1977

[54] TAPE RECORDER AND MAGNETIC TAPE CASSETTE

[75] Inventors: Klaus Schoettle, Ludwigshafen; Heinrich Wittkamp, Mannheim; Karl Uhl, Frankenthal; Gerhard Rotter, Ludwigshafen, all of Germany

[73] Assignee: BASF Aktiengesellschaft, Ludwigshafen (Rhine), Germany

[22] Filed: Dec. 10, 1975

[21] Appl. No.: 639,301

Related U.S. Application Data

[63] Continuation-in-part of Ser. No. 467,636, May 7, 1974, abandoned.

[30] Foreign Application Priority Data

May 9, 1973  Germany .................. 2323327

[52] U.S. Cl. ..................... 360/132; 242/197
[51] Int. Cl.² .............. G11B 23/02; G11B 15/32
[58] Field of Search ........... 360/132, 93, 95; 242/192, 197–200; 352/72–78

[56] References Cited

UNITED STATES PATENTS 3,788,576  1/1974  Buslik .................... 360/132

*Primary Examiner*—Robert S. Tupper
*Attorney, Agent, or Firm*—Johnston, Keil, Thompson & Shurtleff

[57] ABSTRACT

A magnetic tape cassette comprises a housing open on one side and, movable therein, a sheath enclosing a magnetic tape roll. Detachable retaining means in the cassette hold the sheath and the roll in position while the cassette is not on the recorder. The retaining means are detachable by unlatching means when the cassette is fitted to the recorder, so that, following a movement of the sheath, the cassette is opened to allow the roll to emerge at least partially from the cassette and the circumference of the roll to be rotated by means of a recorder-associated capstan provided outside the cassette. Further advantageous embodiments of the invention concern the cassette and the recorder. The cassette of the invention and the recorder associated therewith can be employed in all fields of magnetic tape recording and reproduction. Its application to a magnetic tape system with a self-threading tape end entails advantages.

10 Claims, 8 Drawing Figures

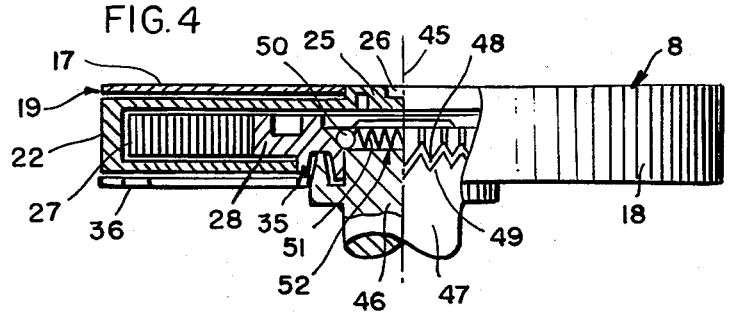
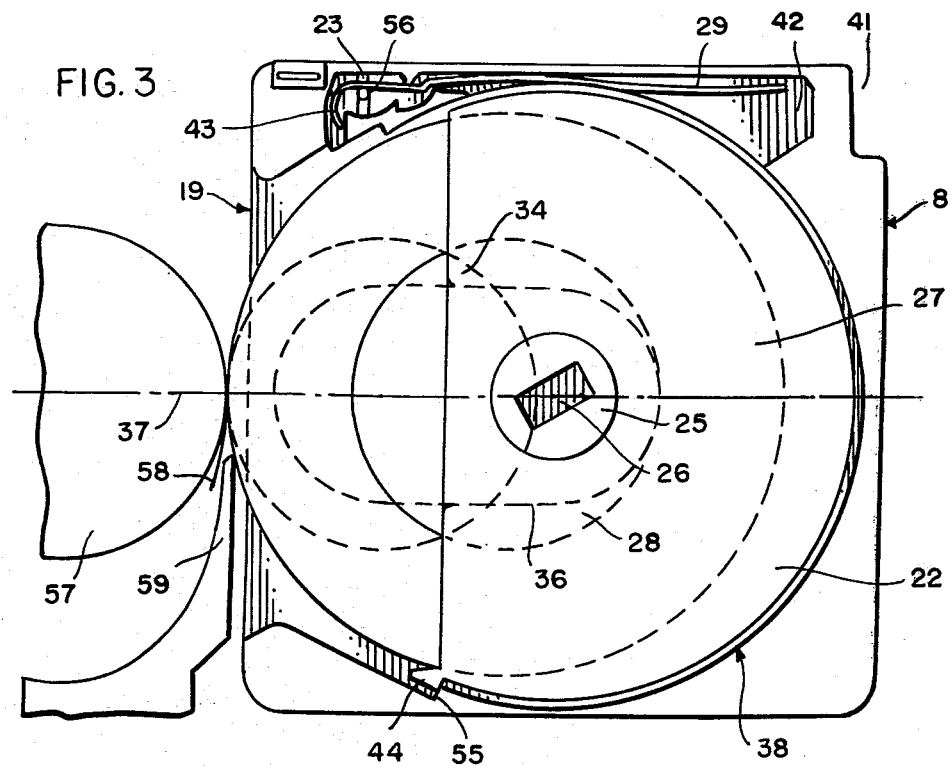

TAPE RECORDER AND MAGNETIC TAPE CASSETTE

This is a Continuation-in-Part of our application Ser. No. 467,636, filed May 7, 1974 and now abandoned.

This invention concerns a tape recorder with magnetic tape cassette, the latter consisting of a cassette housing with bottom, top and side walls and a lateral opening enclosing at least partially the roll of magnetic tape wound on a flangeless reel, the circumferential surface of the tape roll being moved towards, and capable of being pressed against, a recorder-associated capstan after the reel in the cassette has been engaged by a recorderassociated reel take-up device, so that the tape roll can be driven.

A tape transport system with a tape cassette of this type has already been disclosed by U.S. Pat. No. 3,604,656. According to that specification, the cassette is of circular shape and has a lateral opening which cannot be closed, which allows a capstan to enter the cassette in order to drive a take-off reel contained therein and which allows the tape to exit from the cassette. The take-off reel is supported rotatably, but undisplaceably, by means of pins in apertures of the circular walls. Movement of the reel towards the capstan while the diameter of the tape pack decreases is effected by the guided displacement of the whole cassette by means of guide pins on the lower circular wall of the cassette and by means of a guide groove, cooperating therewith, in the tape recorder deck, and also by guide means which surround the cassette laterally.

Whatever the construction of these known tape transport systems may be, the spring-loaded displacement means act upon the cassette housing from without and, thus, exercise only indirect pressure upon the tape pack which is to be urged against the capstan. The tape pack is provided with primitive bearing means in the shape of the above-mentioned pins which engage apertures in the circular walls of the cassette. Important disadvantages of the above-described tape transport system with cassette are that a. in the cassette, the tape and the reel as a whole are not sufficiently protected for external influences;
b. the economic manufacture of the cassette, for example from synthetic material, cannot be realized, especially from the point of view of high reel speeds in the cassette, because of the primitive bearing means for the reel;
c. nearly friction-less guidance of the cassette on the transport system can only be achieved at great cost;
d. error-proof insertion of the cassette between the guide elements is not ensured;
e. the capstan enters the cassette; the cassette aperture and the dimensions of the capstan will therefore have to be closely matched with each other;
f. the circular shape of the cassette renders its handling and filing more difficult for domestic use;
g. in view of the cassette being supported in a movable manner, very complex recorder-associated operating devices become necessary which make operation more difficult.

The present invention has for its object to improve the known tape recorders and cassettes, to make them functionally more efficient, easier to handle and to file and more economic to manufacture on a large scale.

According to the present invention, in the case of a tape recorder with magnetic tape cassette when the latter consists of a housing with bottom, top and lateral walls and a lateral aperture which enclose at least partially a magnetic tape roll wound on a flangeless reel, the circumferential surface of the tape roll being movable towards a recorder-associated capstan and capable of being pressed against the latter for driving purposes after the cassette has been made to engage recorder-associated reel take-up means, the cassette comprises in its housing a sheath which partially encloses the magnetic tape roll and is movable relative to the housing, and, when the cassette has been removed from the recorder, the sheath covers the lateral aperture of the housing and cassette-associated retaining means hold the roll in a fixed position inside the sheath and, when the cassette has been fitted to the recorder, recorder-associated unlatching members pass through apertures in the cassette, in order to move the sheath so as to clear the lateral opening and the retaining means can be operated to release the roll such that the roll can be made to move by the retaining means and to emerge at least partially from the lateral opening of the cassette in the direction towards the capstan.

By devising the recorder and the cassette in this way, maximum safety is achieved for the tape pack, the cassette and the recorder, and the mass production of these units is simplified.

In an advantageous embodiment of the invention, the cassette comprises a housing of substantially cuboid shape and a sheath pivotably mounted therein which, in plan view, conforms to the shape of the segment of a circle, the housing being provided in its bottom wall with a slot-like aperture, and the sheath wall facing this bottom wall being provided with a cut-out partly congruent with the above-mentioned slot-like aperture.

Further according to the invention, the cassette associated retaining means are formed by a spring urging the tape roll towards the lateral wall of the sheath and by the slot-like aperture in the bottom wall of the housing and the cut-out of the lower sheath wall, the reel being clamped between the said aperture and the said cut-out.

Cassettes designed in this way consist of few functionally efficient parts which are easy to manufacture, provide safe protection of the tape roll and safely fix its position during transport.

Further according to the invention, the sheath is provided with a boss by means of which it is rotatably mounted in an aperture of the bottom or top wall of the housing.

In a preferred embodiment, the spring is provided with a detent which engages a nose provided on the sheath. Below the spring, a slot is provided in the bottom wall of the housing through which a recorder-associated unlatching element passes into the cassette when the latter is fitted to the recorder, the said unlatching element shifting the spring during the fitting operation from the position in which it locks the tape roll and the sheath into a position where it releases the roll and the sheath to move freely.

In a preferred embodiment of the invention, the boss provided on the sheath has a recess accessible from outside the cassette in which the pin of a recorder-associated, pivotable lever engages when the cassette is fitted to the recorder, the sheath being pivotable relative to the housing by operating the lever such that the lateral apertures of the housing and the sheath face each other and the aperture in the bottom wall of the housing and the cut-out of the lower sheath wall are moved into coincident positions, one above the other.

In this way, reliable cooperation between the cassette and the recorder parts is guaranteed, as well as simple and reliable handling.

The recorder in which the cassette of the invention is to be used is provided with a pin capable of moving in the recorder deck and of operating the spring in the cassette when the latter is fitted to the recorder, and provided also with a pivotal supported lever above the fitted cassette, the lever being provided with a catch engaging a recess in the boss of the sheath. The main advantages of the tape recorder and cassette of the invention are a. simple and easy handling
b. few parts which are easy to assemble
c. low-cost manufacture of the parts
d. reliable operation, due to the protection of the tape roll at all cassette apertures, safe protection and fixation of the tape roll outside the recorder and the low number of clearly arranged control elements for operating the cassette on the recorder.

An embodiment of the invention has been illustrated in the accompanying drawings and will now be described in further detail.

FIG. 1 shows a tape recorder with half inserted cassette;

FIG. 2, in diagrammatic representation, the cassette of the invention in the transport condition;

FIG. 3 the cassette of FIG. 2 in its operating position on the recorder;

FIG. 4 a part-sectional side elevation along line A–A' of FIG. 2, of a cassette fitted to the recorder;

FIG. 5 a sectional view of the recorder and the cassette on the line B–B' of FIG. 1;

Figure 1:
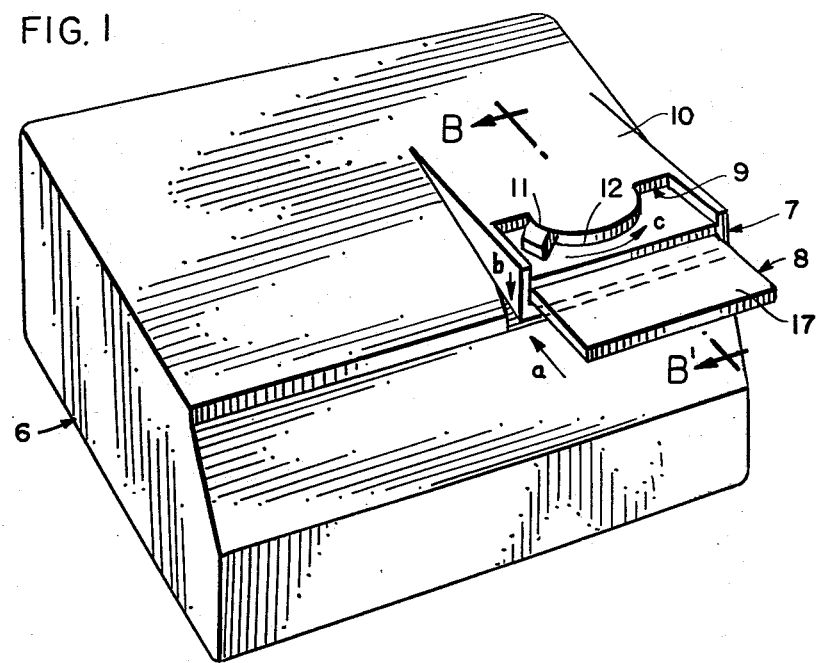

A tape recorder 6 comprises a compartment 7 in which a cassette 8 can be inserted. The compartment 7 is shown in the open position, and the cassette 8 in the half-inserted position. To transfer the cassette 8 into its operative condition on the recorder 6 it is necessary to push the cassette 8 into the compartment 7 in the direction of arrow a, so that it vanishes therein completely. Thereafter the compartment 7 can be closed by manual pressure in the direction of arrow b. Above the compartment 7 is another compartment 9 with a top wall 10 and a lever 11 with handle, the latter being movable in the direction of an arrow c. The top wall 10 has a circular edge 12 along which the lever 11 can be moved.

Figure 2:
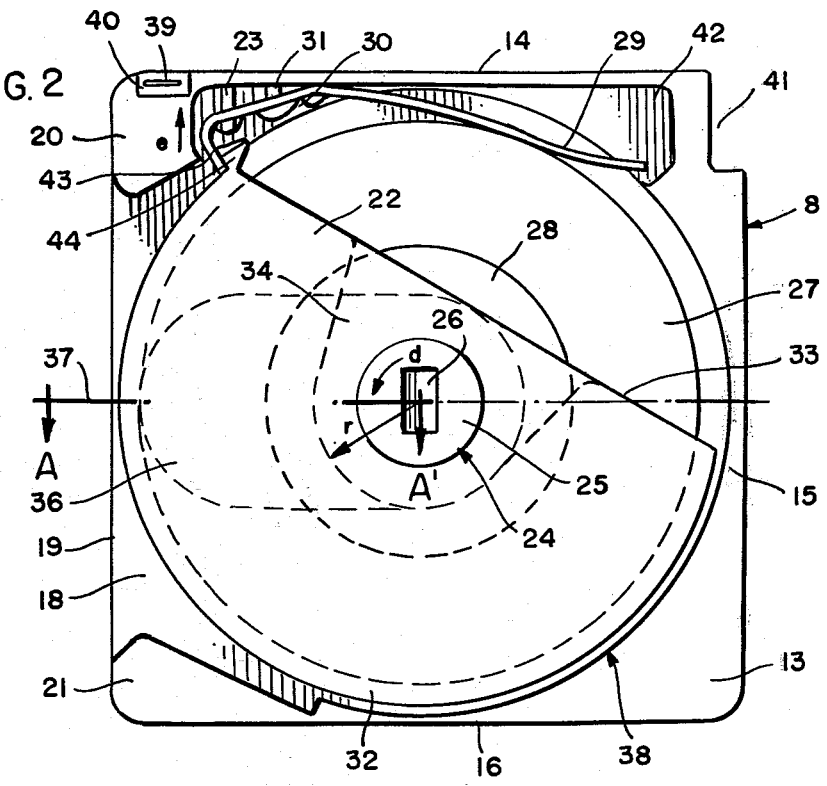

In FIG. 2, the cassette 8 is shown in the transportable condition. The outer part of the cassette 8 consists of a housing 13, formed by the lateral walls 14–16, a top wall 17 and a bottom wall 18. On the fourth side of the cassette housing is a rectangular lateral aperture 19, laterally delimited by the wall portions 20 and 21. The inner part of the cassette 8 is designed in the shape of a sheath 22. Viewed in plan, the sheath 22 conforms to the shape of the segment of a circle, larger than the semicircle. However, the sheath 22 may also be of circular shape. The sheath 22 is pivotably mounted in a circular aperture 24 in the top wall 17 of the housing 13, by means of a circular boss 25 formed on the upper wall of the sheath 22, see FIG. 4. On the side of the boss 25 accessible from outside of the cassette housing 13 is provided a rectangular recess 26. The sheath 22 encloses a magnetic tape roll 27 wound on a flangeless reel 28. Above the tape roll 27, a leaf spring 29 is held between projections 30 and 31 of the housing which, with its free end, bears on the circumference of the tape roll 27. Owing to the suitably dimensioned bearing pressure of the spring 29, the roll 27 is urged with proper force against the arcuate wall 32 of the sheath, and the roll 27 is thus secured against movement in the cassette. The arcuate wall 32 of the sheath 22 extends around the curved part of the sheath 22, whereas its straight part (extending perpendicular to the secant of the circumference) is open and thus forms a sufficiently large exit aperture 33 for at least part of the tape roll 27. As indicated by a dotted line, the lower wall of the sheath 22 has a curved cut-out 34 part of which is a circular arc with radius r which is slightly larger than the radius of a lower annular projection 35 in the reel 28 (FIG. 4). The bottom wall 18 of the housing 13 is provided with a slot-like aperture 36 the circular portions of which have the radius r. Longitudinally, the aperture 36 extends in the direction of the center line 37 of the cassette 8, symmetrically of this center line. In the housing 13, the sheath 22 can move along the path of a circular rim 38 which may consist of several part sections but is preferably a single moulded piece. The piece or pieces may be moulded integrally with the bottom or upper wall 18 or 17 of the housing or with both these walls. The radius of the circular rim 38 is slightly larger than the radius of the outer arcuate wall of the sheath 22, so that at most a low sliding friction is set up between the arcuate wall and the circular rim 38.

Behind the lateral wall 14 of the housing 13, a recording barrier is provided in the form of a break-away member 39 in an aperture 40 of the wall. At the corner of housing 13 where the side walls 14 and 15 meet, a recess 41 is formed in the housing along part of the side wall 15 which is intended as a mark on the cassette 8 preventing wrong insertion of the cassette in the compartment 7 of the recorder 6. Another preventive measure guarding against wrong insertion is the slightly rectangular formation of the housing 13. The side walls 14 and 16 are slightly shorter than the wall 15.

The spring 29 is slightly wider than the tape, so that the tape cannot be damaged by the edges of the spring 29. Unimpeded movement of the spring 29 is possible in a recess 42 of the moulded part by which the circular rim 38 is formed. Viewing the spring from its free end, a hook-like detent 43 is provided on the spring 29 behind the projections 30 and 31. When the sheath occupies the position shown in FIG. 2, this detent 43 engages a nose 44 which is attached, and preferably integrally moulded to, the outside of the arcuate wall 32 of the sheath, beside the exit aperture 33 for the tape roll 27. Near the detent 43 of the spring 29 a slit-like aperture 23 is provided in the bottom wall 18 of the housing 13, in a position such that the passage of an unlatching element between the spring 29 and the projection 30 becomes possible, having due regard to the shape of the latter.

We shall now enumerate the most important parts of the cassette 8 according to FIG. 2, and briefly explain their operation. The cassette 8 is a slightly rectangular housing 13, with a sheath 22 designed so as to be movable therein, the sheath enclosing about three quarters of the tape roll 27 when it occupies the position shown in FIG. 2. The sheath 22 and all the other parts of the cassette are dimensioned in such a way that the tape roll 27, while closely enveloped, cannot suffer damage. The tape roll 27 is a self-supporting, very tightly wound coil which retains its disc-like shape more or less exactly. If the abovedescribed cassette 8 is to be used for tape packs consisting of less tightly wound coils, it may be advisable to provide for the sheath 22 not only freedom of movement along the circular rim 38 (i.e. substantially parallel with the planes of the walls 17 and 18), but freedom of movement also in the vertical direction such that the sheath 22 executes a guided movement on a helical path. In this way it becomes possible to exert slight pressure on the lateral surfaces of the tape roll in certain zones, or at least to maintain very narrow tolerances without adopting costly methods of manufacture.

A spring 29 bears on the non-enclosed portion of the tape roll 27 and urges it towards the inner surface of the arcuate wall 32 of the sheath 22 in such a way that at least one movement of the roll 27 in the sheath 22 is limited and, at the same time, the loose part of the outermost turn at the circumference of the tape pack 27 is kept in place. The sheath 22 is free to move along a circular rim 38 within the housing 13. When the sheath occupies the position shown in FIG. 2, the lateral opening 19 of the housing 13 is covered from within by the sheath 22. A detent 43 which is part of the spring 29 serves as a stop for the sheath 22. A slot-like aperture 36 in the housing 13 and an aperture 34 in the sheath 22 cooperate with the reel 28 as a further means for fixing the tape roll 27. A recess 41 in the housing prevents the wrong-sided insertion of the cassette 8 in the recorder 6.

With the possible exception of the spring, the cassette 8 can be mass-produced from suitable injection-moulded, extruded or pressed synthetic material. The individual parts of the cassette may be manufactured with the usual tolerances without the functions of the cassette being impaired. The sheath may be produced in two pieces or, advantageously, alos in one piece.

FIG. 4 shows, to the left of a center line 45, the cassette 8 of FIG. 2 in section along the line A–A', in the position it assumes after it has been fitted to the recorder. Under these conditions, the cassette 8 is already positioned on the reel takeup means of the recorder 6 which further comprise positioning means (not shown) for the cassette 8 (inside the compartment 7 of the recorder 6) and of the toppart 46 of a recorder-associated, rotatable shaft 47. With the reel 28 of the tape pack 27, the cassette engages the head 46 of the shaft 47. To make this possible, the reel is provided, within the annular projection 35, with an interior toothing 48 which cooperates with an exterior toothing 49 on the toppart 46 of the shaft 47.

To the right of the center line 47 in FIG. 4, the toothings 48 and 49 are shown in elevation in a part-sectional view of the cassette 8. A non-rotational ball-catch construction can be made to snap-engage quite reliably. This device consists of two balls 50 biased in radial direction by means of a helical spring 51 held in a bore 52 at the toppart 46 of the shaft 47, the spring causing the balls 50 to snap-engage the gaps of the interior toothing 48 of the reel 28 when the reel slides into position. In FIG. 4, the ball 50 bears already on one of the teeth 48. Snap-engagement takes place during or after the downward movement of the compartment 7, with the cassette 8 having been inserted. Obviously, it would be possible to use different suitable take-up means for the reel, for example a conical design with resiliently supported catch pin, always provided that the reel is fixed in a predetermined vertical position and nonrotatably secured relative to the toppart of the shaft and that the connection between reel and shaft can be made quickly and reliably with a design which guarantees simplicity in manufacture. Concentrically above the reel 28 may be seen the boss 25 of the sheath 22, with its recess 26.

Figure 5:
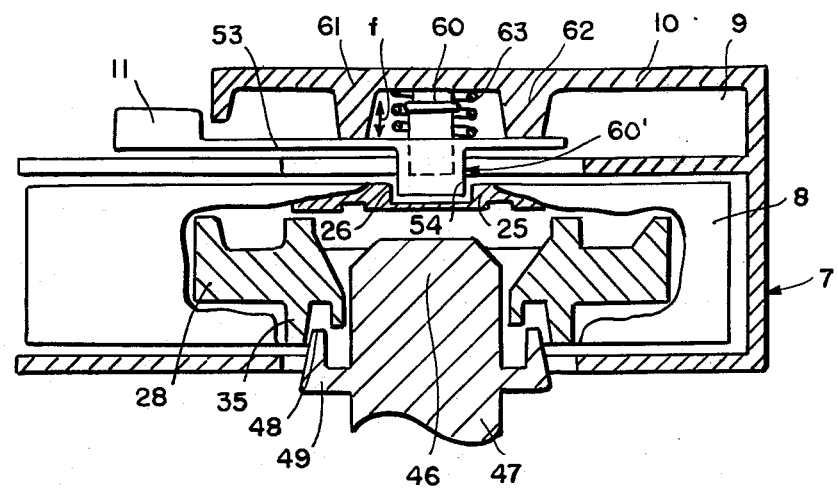

FIG. 3 shows the cassette 8 in the operating position on the recorder 6. The sheath 22 is shown here in a position in which the exit aperture 33 faces the lateral aperture 19 of the housing 13, so that the tape roll 27 can emerge from the cassette 8, as is shown in the drawing. The sheath 22 is transferred into the position shown by means of a lever 53 (FIG. 5). This lever is provided at the end projecting from the compartment 9 with a handle 11 and, at its other end, with a pin-like projection 54 of rectangular cross section which engages the recess 26 of the boss 25 of the sheath 22 when the compartment 7 is depressed. When the lever 11 is shifted in the direction of arrow $c$ (FIG. 1) to the extreme position, a rotation of the boss 25 in the direction of arrow $d$, for example, causes the sheath 22 to be pivoted through 120° – noticeable from the oblique position of the recess 26 in FIG. 3. The circular rim 38 of the housing 13 is provided with a stop 55 for the nose 44 of the sheath 22. The result of the rotation of the sheath 22 is that the curved part of the cut-out 34 is moved to a position above the congruently curved posterior part of the slot-like aperture 36, so that the path for the reel 28, and thus for the tape roll 27, in the direction towards the lateral aperture 19 of the housing 13 is cleared and the tape roll 27 is "unlocked." A condition for the rotatability of the sheath 22 and the release of the tape roll by the spring 29 is that already during the insertion of the cassette 8 in the recorder 6, a recorder-associated unlatching element—for example pin 56—penetrates through the slit 23 of the bottom wall 18 of the housing. As the compartment 7 is depressed, the pin is moved in the direction of arrow $e$ (FIG. 2), for example by means of a linkage (not shown) provided on the hinged part of the compartment 7, whereby the spring 29 is clamped, so that the free end of the lever is detached from the edge of the roll and releases it and the detent 43 releases the nose 44 of the sheath 22. It is only after the above-described release operations that the actuation of the lever 53 for the purpose of pivoting the sheath 22 becomes possible. When the lever 53 is actuated, i.e. shifted, this process is accompanied by an operation which prevents the compartment 7 from being opened again. This can be achieved by suitable means, e.g. by a lever arrangement such as used in cassette recorders.

The above-described precautions ensure that the opening of the cassette 8 and the release of the tape roll 27 can only take place if the cassette 8 has been inserted correctly in the recorder 6 and that a cassette 8, which has already been opened, can no longer be removed from the recorder 6. If the positions of the tape roll 27 in FIGS. 2 and 3 are compared it will be seen that in FIG. 3 the roll 27 has already been pushed out of the lateral opening 19 of the housing 13 and has assumed a position of contact at the circumference of a capstan 57, indicated diagrammatically by a semi-circle, which forms the drive element for two tape rolls in a tape recorder operating on the contact-winding principle. If in a recorder of this type adequate bearing pressures are to be maintained between the capstan and the tape rolls it is necessary for the rolls to move towards the capstan and away from it as the roll diameters decrease or increase. As well known in the art, in apparatus of this type, the recorderassociated shafts carrying the tape rolls are preferably supported in relatively movable carriages interconnected by springs, for example, so as to be radially displaceable automatically under the action of these springs towards and away from the capstan circumference, respectively, as the tape is wound off one roll and onto the other roll.

The above-described shaft 47 which receives the reel 28 is supported in the above-described manner so as to be displaceable along the center line 37 in the direction towards the lateral aperture 19. The reel 28 is thus displaced by means of the shaft 47, guided within the aperture defined by the cut-out 34 and the slot-like aperture 36. The tape roll 27 is a complete reel from which the front end of a leader 58 is peeled off by means of a blade 59. With the aid of guide means, not shown, the leader 58 is taken around the capstan 57 and fastened to the core of a take-up reel. In this way the magnetic tape is drawn off the take-off reel 27, to be wound on the take-up reel not shown here. The leader 58 consists of a plastic film usually thicker than the magnetic tape and is fastened thereto by known means such as teeth provided along the edge of the leader. Owing to the construction of the cassette 8, the leader 58 cannot become detached from the edge of the tape roll, mainly because of the spring 29 and the sheath 22 by which the turns of the tape roll are held together. Contact and distance between the tape roll circumference and the inner sheath surface is preferably such that the leader remains in contact with the tape roll circumference. Also the other spaces between roll and cassette components are dimensioned and shaped in such a way that the leader cannot stick or detach itself even if the roll is turned in the wrong direction and even it the end of the leader has become slightly detached from the roll circumference.

Detachment of the leader 58 prior to threading in the recorder 6 would cause trouble in the case of a predominantly automatic tape transport. The empty reel which comes to bear on the capstan circumference after the tape has been completely unwound is shown by dotted lines. Subsequently, rewinding of the magnetic tape from the erstwhile take-up reel back on the supply reel 28 of the cassette 8 may take place until the full tape roll diameter has been restored.

FIG. 5 shows the recorder 6 in section along the line B–B' of FIG. 1, but here the cassette 8 has already been inserted in the compartment 7 and fixed therein, and the compartment 7 has been closed and the lever 53 occupies the center position, more or less at the imaginary point of intersection of the line B–B' with the circular arc 12. As will be seen from the drawing, the lever 53 is rotatably supported on a pivot 60 fixed to the top wall 10. The boss 60' of lever 53, which rotatably receives pivot 60, is provided at its bottom end with the aforementioned rectangular projection 54, and the connection between the pivot 60 and the boss 60' is such that the lever can move in the directions of the double arrow f. Helical tension spring 63 which at one end is attached to top wall 10 and at the other end to lever 53 tends to pull this lever upwardly against cams 61 and 62. In the illustrated central position of the lever 53, the latter is held depressed in a low position by cams 61 and 62 arranged symmetrically of the pivot 60, more or less on the line B–B' of FIG. 1, on the underside of the top wall 10 of the compartment 9. In this position, the rectangular projection 54 of the lever 53 exerts pressure on the boss 25, and thus on the sheath 22. If, as has been shown diagrammatically in FIG. 5 in an exaggerated way, the reel 28 did not engage the top part 46 of the shaft 47 correctly while the compartment 7 was being closed, such engagement can therefore still be effected reliably and in time, prior to the complete opening of the cassette 7 (by rotation of the sheath 22 into the position shown in FIG. 3).

Figure 6:
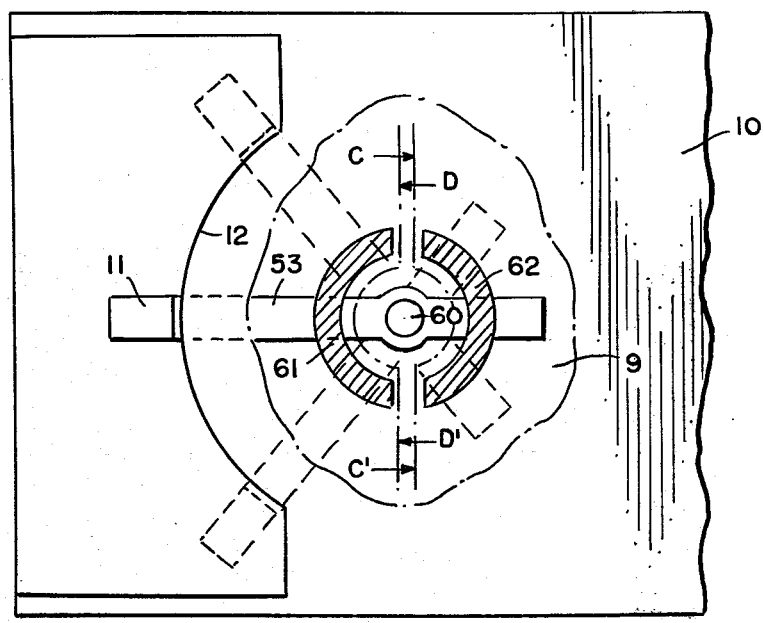
FIG. 6 is a part-sectional top view of the recorder at its cassette loading location.
Figure 7:
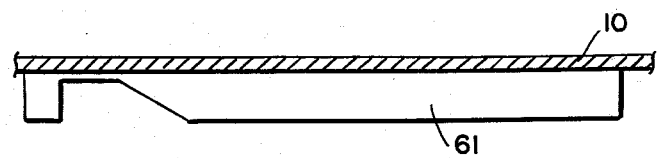
FIG. 7 is a part-sectional end view of details of the top wall of the recorder at its cassette loading locating as viewed along line D–D' of FIG. 6.
Figure 8:
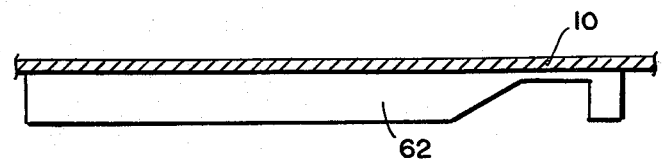
FIG. 8 is a part-sectional end view of details of the top wall of the recorder at its cassette loading location as viewed along line C–C' of FIG. 6.

In the top view of the cassette loading portion of the recorder illustrated in FIG. 6, part of the top wall of the recorder has been broken away; cams 61 and 62 have been shown in horizontal section; and lever 53 has been shown in its center position in full lines and in its two extreme positions in broken lines. As will be seen from FIG. 6, cams 61 and 62 are of arcuate shape. More particularly, as shown in FIG. 6, cam 61 extends, along an incomplete semicircle, about pivot 60 on the left side thereof, and cam 62 extends, along a complementary, likewise incomplete semicircle about pivot 60 on the right side thereof. FIGS. 7 and 8 show the two cams in enlarged, developed projection as viewed, radially outwardly from the axis of pivot 60, along line D–D' and C–C', respectively, of FIG. 6. As will be noted from FIGS. 7 and 8, the cam surfaces of each of the two cams form a ramp of a height which increases from the left to the center position of the lever, as viewed in FIG. 1 or 6, and which remains constant between the center and the right position of the lever as so viewed. Since, as shown in FIGS. 7 and 8, the configuration of cam 61 is the mirror image of that of cam 62, a symmetrical pressure is exerted on sheath 22 of the cassette.

The major advantages of the cassette and the recorder of the invention, with reference to the above-described embodiment thereof are that, owing to the construction of the cassette, the tape roll, prior to the insertion of the cassette in the recorder, is protected from all external influences such as dust, dirt and mechanical damage and that the cassette, after insertion in the recorder, operates reliably and largely automatically, with maximum protection of the cassette and the recorder against faulty actuation, and that the cassette as well as the recorder components designed in accordance with the cassette construction can be mass-produced easily and economically. Another important advantage, by comparison with the present state of the art, is that the cassette is fixedly locked on the recorder and only the tape roll has to be moved. In this way it became possible to omit a large number of additional operating devices which would otherwise have been necessary and to simplify the operation.

We claim:

1. A magnetic tape cassette comprising a housing containing a tape roll wound on a reel, said housing having an opening formed in a wall thereof, and said housing containing a sheath partly surrounding the roll, means mounting said reel in said housing for both rotational and transverse movement relatively thereto, and means mounting said sheath in said housing for movement relatively thereto from a normal position in which said sheath substantially keeps said reel from transversely moving relatively to said housing and in which said sheath closes said opening, to an operative position in which said reel is freed for transverse movement in the direction of said opening and part of the roll of tape thereon is made accessible for edge driving from the outside of said opening.

2. A magnetic tape assembly comprising a tape recorder and a magnetic tape cassette;
  said tape recorder including a driving capstan, a shaft mounted for rotation and also for transverse movement in the direction of said capstan, and cassette-enabling means; and
  said cassette including a housing with bottom, top and side walls which at least partially enclose a magnetic tape wound on a flangeless reel; there being provided in said housing
    a lateral opening in one of said side walls,
    a sheath partly enclosing said magnetic tape roll and normally shutting said lateral opening,
    means mounting said sheath in said housing for movement relatively thereto,
    retaining means for normally locking the tape roll against movement inside the sheath, and
    aperture means for admitting said enabling means into the cassette;
  said enabling means, when said cassette has been fitted on the recorder with said reel placed in position on said shaft, entering said cassette through said aperture means to deactivate said retaining means and move said sheath to a position where it exposes said lateral opening; and
  said reel with the magnetic tape thereon, responsive to transverse movement of said shaft, being shifted relatively to said cassette housing and said sheath, at least partly through said lateral opening, into edge driving engagement with said capstan.

3. A magnetic tape assembly according to claim 2.
  wherein said sheath mounting means comprising a central boss on said sheath and an aperture, forming part of said aperture means, in the top wall of said cassette housing for mounting said sheath by means of said boss for pivoting movement relatively to said housing;
  wherein a nose is formed on said sheath adjacent the circumference thereof;
  wherein said retaining means comprise a spring mounted on said housing for normally locking said roll of tape against movement and a detent cooperating with said nose for holding said sheath in shutting condition; and
  wherein said cassette-enabling means comprise an unlatching element which, incident to the cassette being fitted on the recorder enters another aperture forming part of said aperture means, to transfer said spring to a position where it disengages said tape roll and releases said sheath.

4. A magnetic tape assembly according to claim 3 wherein said cassette-enabling means also comprise a lever mounted for pivoting movement on said recorder in a location above the fitted cassette, said lever being formed with a projection engaging a recess in the boss pivotally mounted in said first-mentioned aperture, such that pivoting movement of said lever causes said sheath to be pivoted to said position where it exposes said lateral opening.

5. A magnetic tape assembly according to claim 2 wherein said cassette housing is of substantially cuboid shape;
  wherein said sheath mounting means comprise means for mounting said sheath for pivoting movement about an axis perpendicular to the principal plane of said cassette;
  wherein said sheath, viewed along said axis, has the shape of the segment of a circle so as to leave a peripheral opening normally out of registry with said lateral opening in the cassette housing;
  wherein said housing is provided in the bottom wall with a slot-like aperture and the sheath wall facing said bottom wall with a cut-out partly congruent with said slot-like aperture; and
  wherein said enabling means, when said cassette has been fitted on the recorder, enters said cassette through said aperture means to deactivate said retaining means and move said sheath to a position where said slot-like aperture and said cut-out are in alignment to permit said reel to be shifted therethrough, and where said lateral opening and said peripheral opening are in registry to permit said roll of tape to pass, incident to said shifting, at least part way through said lateral opening.

6. A magnetic tape cassette comprising a cassette housing with bottom, top and side walls which at least partially enclose a magnetic tape roll wound on a flangeless reel, a lateral opening being provided in said housing in one of its side walls, and said cassette housing containing releasable retaining means, a sheath at least partially enveloping the magnetic tape roll, and means mounting said sheath in said housing for pivoting movement relatively thereto, said retaining means normally holding said roll in place inside said sheath and said sheath normally closing said opening in said housing, and said sheath having coupling means, effective upon release of said retaining means and in response to an actuating force exerted on said coupling means from the exterior of the cassette, to pivot said sheath to an operating position relatively to said housing in which position the sheath exposes said opening so as to free said tape roll for bodily movement relatively to said sheath and said housing, to a location at least partially outside of said sheath and said housing.

7. A magnetic tape cassette according to claim 6, wherein said sheath mounting means include a boss on said sheath, said boss engaging an aperture in the top wall of the housing.

8. A magnetic tape cassette according to claim 6, wherein said cassette housing is of substantially cuboid shape;
  wherein said sheath mounting means comprise means for mounting said sheath for pivoting movement along an axis perpendicular to the principal plane of said cassette;
  wherein said sheath, viewed along said axis, has the shape of a larger-than-semicircular segment so as to leave a peripheral opening through which said tape roll projects, said peripheral opening normally being out of registry with the lateral opening in said cassette housing, and has a lower wall fitting said bottom wall of the housing and being provided with a cut-out partly conforming to said slot-like aperture; and
  wherein in said operative position said cut-out is aligned with said slot-like aperture and the peripheral opening in said sheath faces the lateral opening in said housing such that said reel and said tape roll is freed for bodily movement relatively to said sheath and said housing, to said outside location.

9. A magnetic tape cassette according to claim 8, wherein the releasable retaining means include a spring which, in the normal position of said sheath, exerts pressure upon the tape roll in the direction towards the side wall of the sheath and one side of the cut-out in the lower wall of the sheath and of the slot-like aperture in the bottom wall of the housing so that the reel is clamped between said one side of said aperture and said cut-out.

10. A magnetic tape cassette according to claim 8, wherein said sheath mounting means include a boss on said sheath, said boss engaging in an aperture in the top wall of the housing, and wherein said coupling means include a recess in said boss which is exposed to the exterior of the cassette.

* * * * *